(12) United States Patent
Shyu

(10) Patent No.: US 7,800,838 B2
(45) Date of Patent: Sep. 21, 2010

(54) RECTANGULAR OPTICAL GLASS LENS AND MANUFACTURING METHOD THEREOF

(75) Inventor: San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 75 days.

(21) Appl. No.: 12/176,348

(22) Filed: Jul. 19, 2008

(65) Prior Publication Data
US 2010/0014170 A1 Jan. 21, 2010

(30) Foreign Application Priority Data
Jan. 17, 2008 (TW) .............................. 97101837 A

(51) Int. Cl.
G02B 13/18 (2006.01)
(52) U.S. Cl. ..................................... 359/708
(58) Field of Classification Search ................. 359/619, 359/621, 628, 708
See application file for complete search history.

(56) References Cited
U.S. PATENT DOCUMENTS
6,954,311 B2 * 10/2005 Amanai ...................... 359/621
* cited by examiner Primary Examiner—Joseph Martinez
(74) Attorney, Agent, or Firm—Muncy, Geissler, Olds & Lowe, PLLC

(57) ABSTRACT

A rectangular optical glass lens and a manufacturing method thereof are disclosed. A rectangular glass blank is put between an upper mold and a lower mold of a multi-cavity mold and then being heated and pressured. The rectangular glass blank is molded into a lens sheet having a plurality of optical surfaces and the lens sheet is cut to form a plurality of rectangular optical glass lenses. The rectangular optical glass lens produced by such method includes two optical surfaces working as optical areas and a rectangle circumference on non-optical area surrounding the optical surface. The circumference is a rectangular part with four right angles on each corner while the right angles as well as the rectangular shape are formed by cutting of the lens sheet. Thus the manufacturing method of rectangular optical glass lenses are simplified and the produced lens is assembled with a lens module conveniently.

12 Claims, 10 Drawing Sheets

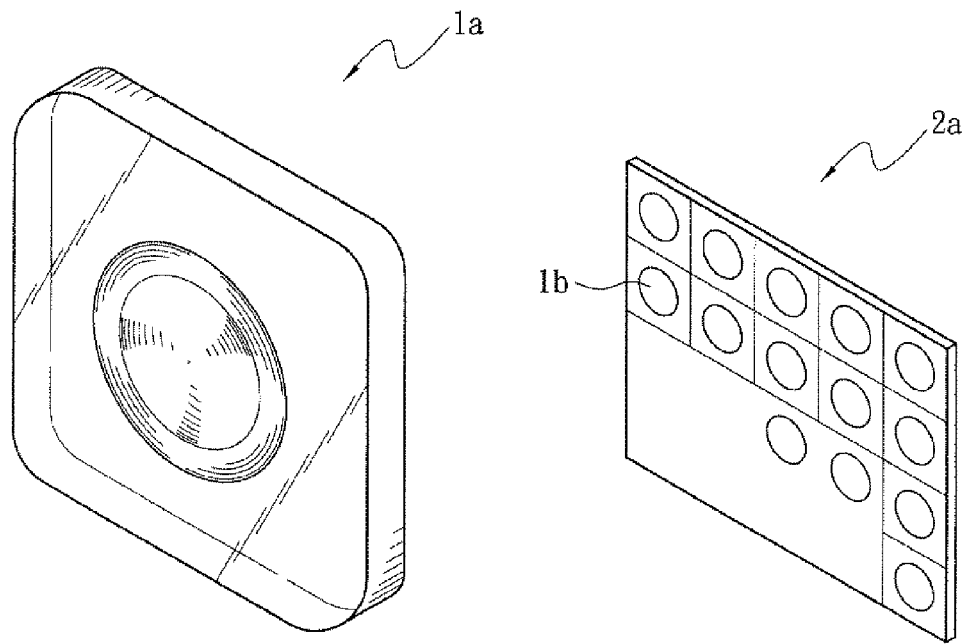
FIG. 1
(PRIOR ART)
FIG. 2
(PRIOR ART)
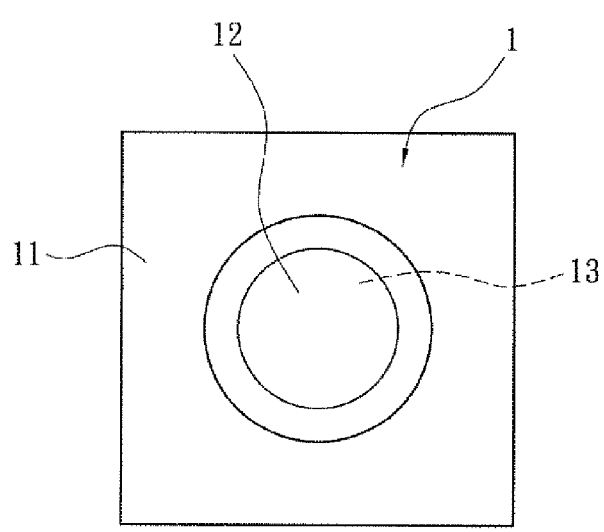
FIG. 3
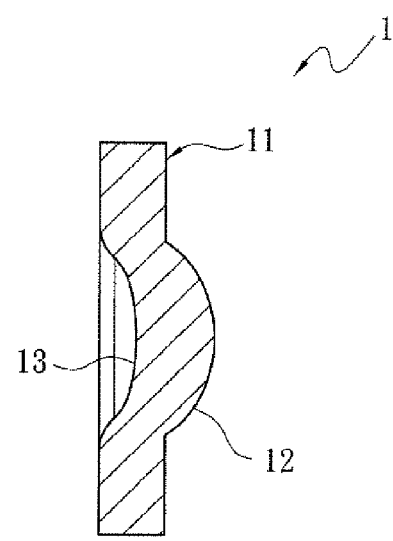
FIG. 4

RECTANGULAR OPTICAL GLASS LENS AND MANUFACTURING METHOD THEREOF

BACKGROUND OF THE INVENTION

The present invention relates to a rectangular optical glass lens and a manufacturing method thereof, especially to a rectangular optical glass lens with optical surface, right-angular circumference, and low cost that is applied to camera phones, other cameras with image sensors such as Charge-Charged Device (CCD), or Complementary Metal-Oxide Semiconductor (CMOS).

A lot of electronics such as digital cameras, PC cameras, network cameras, mobile phones or personal digital assistance (PDA) are required to be equipped with image capturing devices. For easy carrying and requirements of users, the image capturing device not only has good image quality, but also has compact size as well as low cost so that it has more applications. The glass precision molding technology has been applied to produce aspherical molded glass lens with high resolution, good reproduction and low cost such as lens teached in patents, US2006/0107695, US2007/10043463, TWO95101830, TW095133807, JP63-295448 etc. A glass preform is set into a forming mold to be heated and softening. Then increase pressure on an upper mold and a lower mold of the forming mold so as to transfer the soft glass perform become the same shapes as the surfaces of upper mold and lower mold. After cooling, a molded glass lens is released. In order to reduce the manufacturing cost, U.S. Pat. No. 7,312,933 disclosed a rectangular monobloc optical lens $1a$ is made from a cut rectangular glass unit being molded, as shown in FIG. 1. Refer to JP63-304201 and US Pub. No. 2005/041215, lens arrays manufactured by press-molding are disclosed. Refer to JP02-044033, a plate glass $2a$ of FIG. 2, heated-press and repeatedly shift the molds to perform forming of lenses. Then the individual lens $1b$ in FIG. 2 is obtained by cutting the plate glass $2a$. Refer to US 2004/165095, a lens with an infrared ray filter produced by a multi-cavity glass molding method is disclosed. A dielectric multilayer film is provided on one of the surface of a glass plane-convex lens and then being cut into a plurality of infrared ray filters.

Although the multi-cavity molding method can be applied to glass molding technique, such way is only feasible in producing spherical lens, plano-convex, and plano-concave lenses. While applying to aspherical lens in mini-cameras or camera phones, there is residual air in the mold cavity while the process of heating and pressing. This reduces precision of the aspherical glass lens. There are several ways to solve the problems of residual air. For example, refer to JP2002-003225, JP05-286730, JP06-191861, US 20050172671, and EP0648712 etc, the problem of residual air is solved by pressure control, temperature control or surface roughness. Refer to JP61-291424, TWI248919, JP2000-044260, TW200640807, US2005/0242454, air channels are disposed on the mold so as to release residual air. Yet a lot of melt glass will overflow into the air-exhaust channel to form the brim. A further processing is required to shape the brim. Or as shown in JP61-291424, JP08-337428, and U.S. Pat. No. 7,159,420, a groove or a ventilative hole is disposed on the molding unit, especially the lower molding unit. But by such design, corresponding protrudent may occur on the molded lens and this lead to problems in following processing or assembling.

Generally, air exhaust effect is represented by air-exhaust efficiency $\delta$ that equals to the cross-sectional area of air-exhaust channels divided by volume of the mold cavity ($\delta$=cross-sectional area of air-exhaust channels/volume of the mold cavity). The larger the air-exhaust efficiency $\delta$ is, the less air accumulates during the molding process. On the contrary, if the air-exhaust efficiency $\delta$ is getting smaller, it's difficult to release the air. In order to release air effectively, $\delta$ larger than 0.25 is preferred. As to the Multi-Cavity mold, especially the cavity near the center of the mold core, it's getting difficult to release the air. After long-term experiments, the results show that as to rectangular glass, $\delta$ value of the mold cavity near edges of the mold should be larger than 0.25. The $\delta$ value of the mold cavity should be proportional to the distance from the mold cavity to the mold, increasing in a geometric series. Therefore, while producing multi-cavity optical glass lens by precision molding glass technique, the mold should be designed with higher $\delta$ value without forming protrudent on the lens so as to meet requirements of easy mass-production and high yield rate.

SUMMARY OF THE INVENTION

Therefore it is a primary object of the present invention to provide a rectangular optical glass lens and a manufacturing method thereof that a rectangular glass blank is put between an upper mold and a lower mold of a multi-cavity mold and then being heated and pressured so that the rectangular glass blank is molded into a lens sheet having a plurality of lenses. The lens sheet is cut to form a plurality of lenses. The rectangular lens produced by such method includes two aspherical optical surfaces and a rectangle circumference on non-optical area surrounding the optical surface. The circumference is a rectangular part with four right angles on each corner while the rectangles as well as the rectangular shape are formed by cutting of the glass blank. Thus the manufacturing processes of rectangular optical glasses are simplified and the produced lens is assembled with a lens module conveniently.

It is another object of the present invention to provide a rectangular optical glass lens and a manufacturing method thereof.

The surfaces of the upper and lower molds of the multi-cavity mold are further disposed with a plurality of protruding parts. During manufacturing processes, air in the mold cavity is released from gaps surrounding the protruding parts formed by height difference between the protruding part and the rectangular glass blank. Thus the air-exhaust efficiency $\delta$ of the mold cavity surrounding the mold is no less than 0.25 ($\delta \geqq 0.25$) and the air-exhaust efficiency $\delta$ of the mold cavity near center of the mold is no less than 0.5 ($\delta \geqq 0.5$). The air in the cavity is effectively released during the molding processes so as to avoid residual air in the mold cavity that may lead ill-precision on aspherical surfaces. Coordinately, a corresponding groove is formed on the rectangle circumference of the lens sheet.

It is a further object of the present invention to provide a rectangular optical glass lens and a manufacturing method thereof. A plurality of inverted V-shaped strip protrusions are arranged on a cavity surface of the multi-cavity mold in a certain interval vertically and/or horizontally. The inverted V-shaped strip protrusion forms corresponding V-shaped cutting groove on the lens sheet. The cutting grooves can be used as part of cutting lines of the lens sheet and the lens sheet is cut into a plurality of rectangular lenses with the same size. Moreover, the vertical/horizontal inverted V-shaped strip protrusions are disposed discontinuously so that there is a gap between two contiguous vertical/horizontal inverted V-shaped strip protrusions so as to improve air-exhaust efficiency.

BRIEF DESCRIPTION OF THE DRAWINGS

FIG. 1 is a conventional rectangular optical glass lens of a prior art;
FIG. 2 is a lens sheet of a prior art;
FIG. 3 is a front view of an embodiment of lens according to the present invention;
FIG. 4 is a side view of the embodiment in FIG. 3.

DETAILED DESCRIPTION OF THE PREFERRED EMBODIMENT

The First Embodiment

Figure 5:
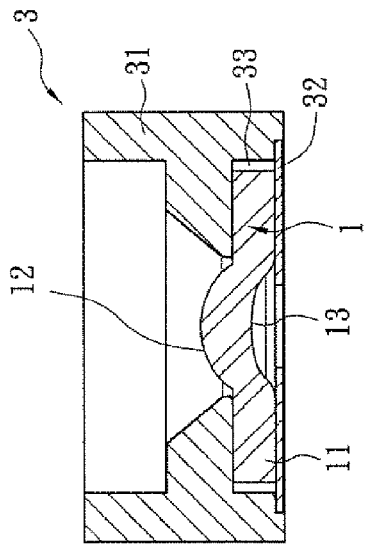
FIG. 5 is a side view of a lens according to the present invention applied to a lens module.
Figure 6:
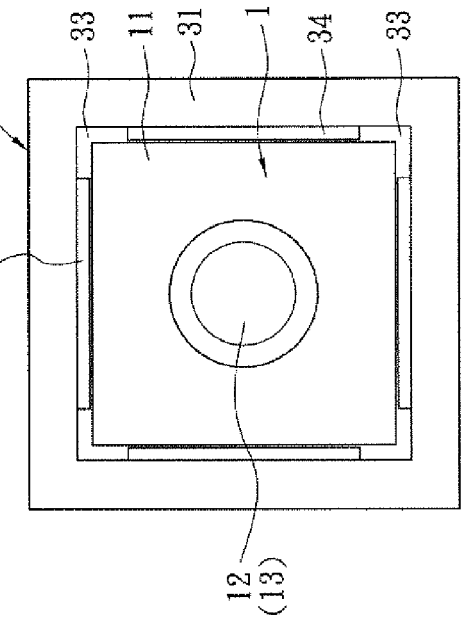
FIG. 6 is a front view of the embodiment in FIG. 5.

Refer to FIG. 3 & FIG. 4, a rectangular optical glass lens 1 in accordance with the present invention consists of a first optical surface 12, a second optical surface 13 and a circumference 11. The first optical surface 12, and the second optical surface 13 respectively are a convex surface and a concave surface, both are aspherical surfaces. The circumference 11 is a rectangular member with four right angles on each corner and is called rectangle circumference 11. The focal length of the lens 1 is about 1.87 mm for this embodiment. As shown in FIG. 5 & FIG. 6, while being assembled in a lens module 3, the rectangle circumference 11 is fixed on a lens holder 31 and light passes the first optical surface and the second optical surface 12, 13, through an aperture 32 and focuses on a CMOS sensor (not shown in figure). The diagonal line of the CMOS sensor is less than 1/7"(inch). As to the first optical surface and the second optical surface 12, 13 in this embodiment, the related parameters are designed by aspherical surface equation (1) and show in the table one.

Aspherical Surface equation (1):

$$X = \frac{CY^2}{1+\sqrt{1-(K+1)C^2Y^2}} + A_2Y^2 + A_4Y^4 + A_6Y^6 + A_8Y^8 + A_{10}Y^{10} + A_{12}Y^{12} + A_{14}Y^{14}$$

where $C=1/R$;
X (Sag value) is distance from a tangential plane at the vertex of the aspheric surface to a position on the aspheric surface
Y is the distance (in mm) from the optical axis to Y axis
C is the curvature in X axis; the inverse of the radius of curvature at the vertex
K: the Conic constant:
$A_2$-$A_n$: respectively is an aspheric coefficient, 2~nth power of Y.

TABLE ONE

| first optical surface 12 | |
|---|---|
| R = −0.5835097 | K = −14.1246 |
| | $A_4$ = −5.1269103 |
| | $A_6$ = 32.985477 |
| | $A_8$ = −193.86029 |
| | $A_{10}$ = 574.86653 |
| | $A_{12}$ = −763.00562 |
| | $A_{14}$ = 0 |
| second optical surface 13 | |
| R = −1.131684 | K = 2.199666 |
| | $A_4$ = 2.4218476 |
| | $A_6$ = −51.453692 |
| | $A_8$ = 327.77628 |
| | $A_{10}$ = −990.56954 |
| | $A_{12}$ = 0 |
| | $A_{14}$ = 0 |

Figure 7:
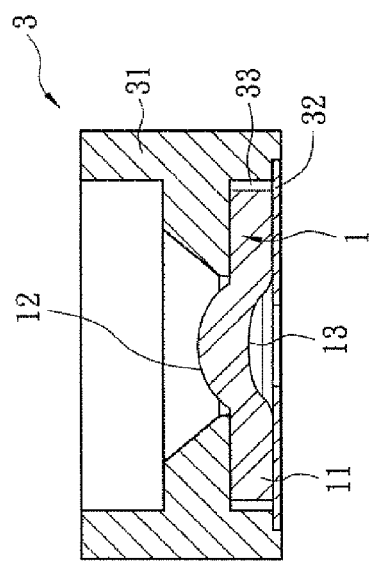
FIG. 7 is another side view of the lens applied to a lens module.
Figure 8:
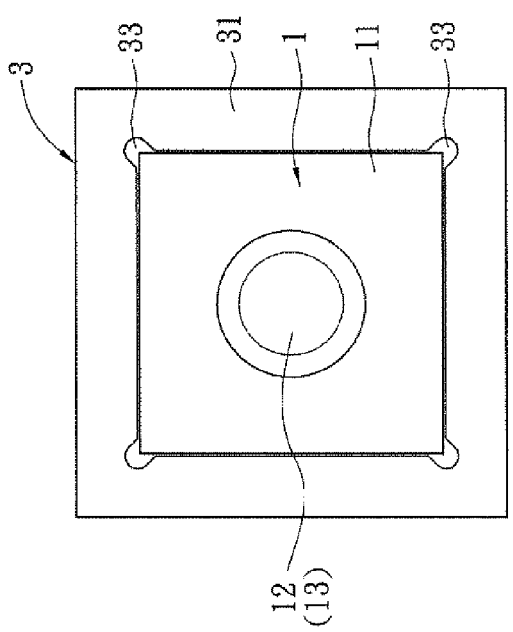
FIG. 8 is a front view of the embodiment in FIG. 7.
Figure 9:
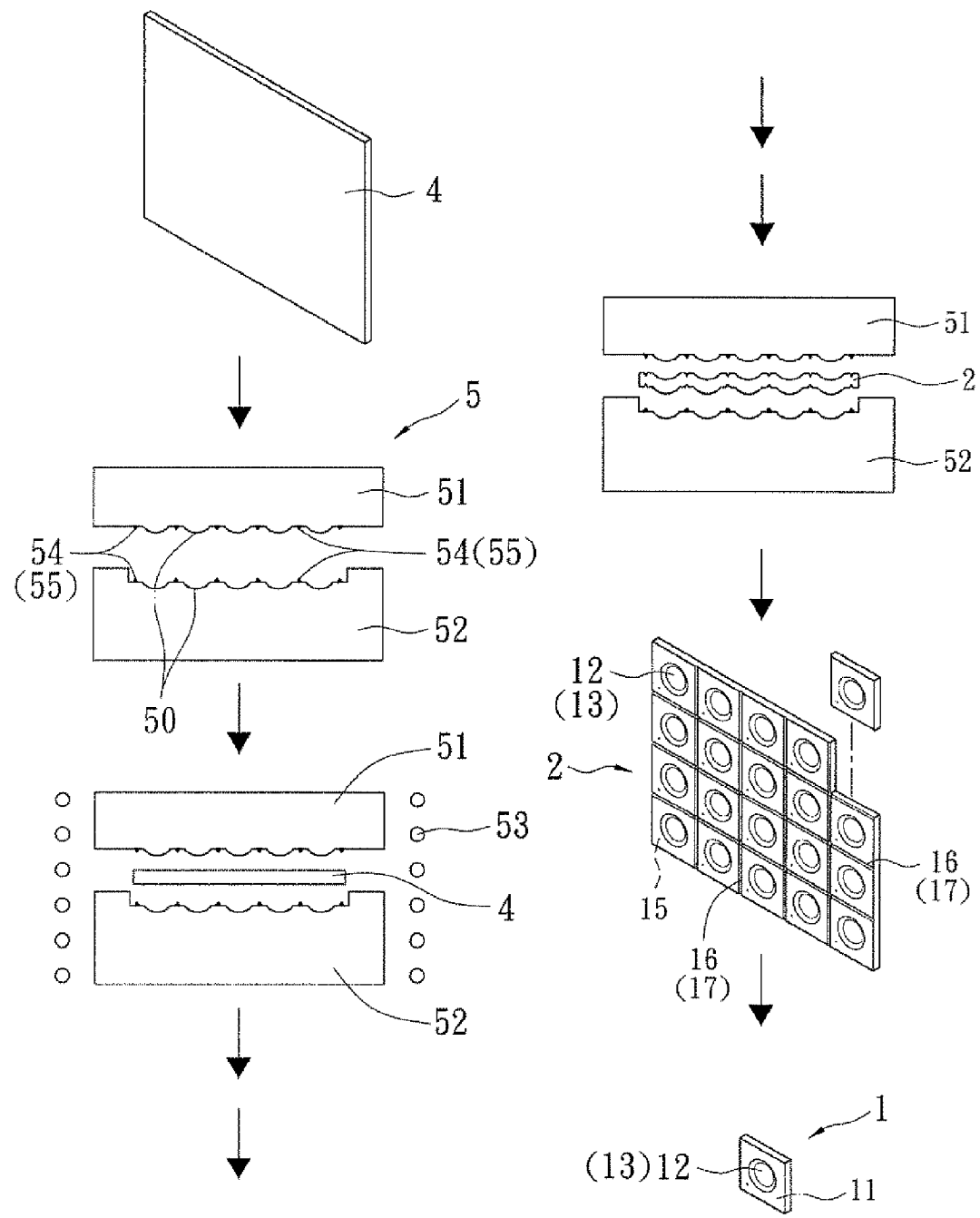
FIG. 9 is a flow chart showing manufacturing processes of the lens according to the present invention.

Refer to FIG. 9, a manufacturing method of a rectangular optical glass lens 1 includes the following steps:
provide a rectangular glass blank 4 formed by H-BAL42 glass material with uniform thickness for saving heating and pressuring time during a molding process;
provide a multi-cavity mold 5 having an upper mold, a lower mold 51, 52 and a cavity surface 50 disposed with a plurality of convex aspheric surfaces and corresponding concave/convex aspheric surfaces;
set the rectangular glass blank 4 between the upper mold and the lower mold 51, 52, being heated into glass transition temperature by a heater 53; then applying heat and pressure to the upper mold and the lower mold 51, 52 for molding so that the rectangular glass blank 4 is molded into a lens sheet 2 having a plurality of first optical surfaces 12 and corresponding second optical surfaces 13;
cut the lens sheet 2 into individual rectangular optical glass lens 1 that includes a first optical surface 12 (convex aspheric surfaces) and a second optical surface 13 (concave aspheric surfaces) and a rectangle circumference 11.
During the above cutting, the lens 1 is formed by horizontal cutting and vertical cutting of the lens sheet 2. Although each corner of the rectangle circumference 11 may become an irregular corner during the cutting processes, the optical function of the first optical surface and the second optical surface 12, 13 will not be affected. Moreover, there is no need to polish irregular corners of the rectangle circumference 11 so that the manufacturing cost is reduced effectively. While assembling, a slot 33 is disposed on each corner of the lens holder 31 of the lens module 3, corresponding the rectangle corner of the rectangle circumference 11 for convenient assembling, as shown in FIG. 5 & FIG. 6. Or, refer to FIG. 7 & FIG. 8, a bump 34 is disposed on each of four sides of the lens base 31 so as to form a slot 33 between the two adjacent bumps 34 for alignment purpose and easy assemble.

The Second Embodiment

Figure 11:
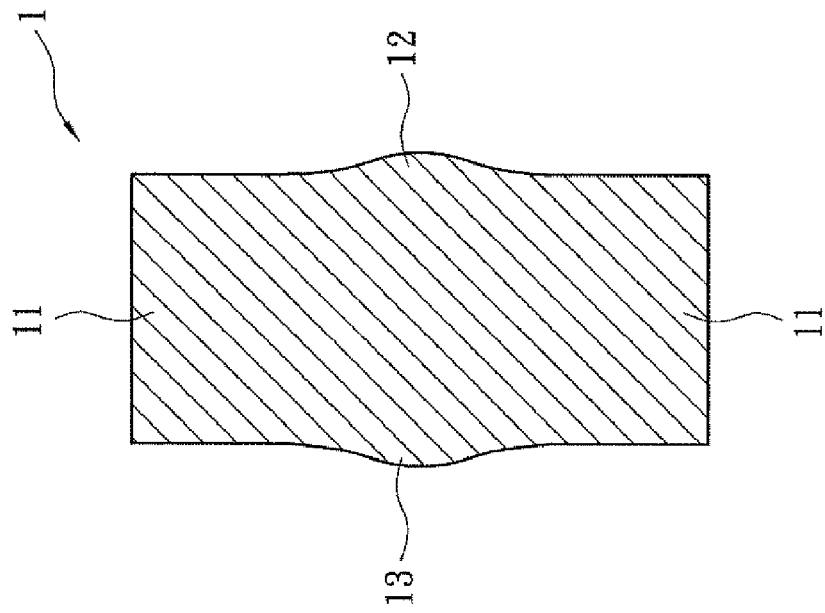
FIG. 11 is a side view of the embodiment in FIG. 10.
Figure 10:
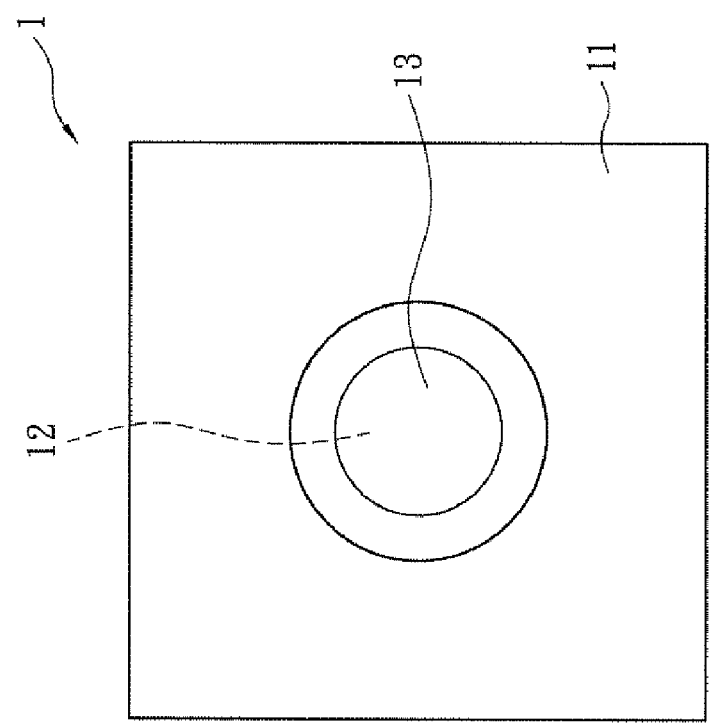
FIG. 10 is a front view of another embodiment according to the present invention.
Figure 12:
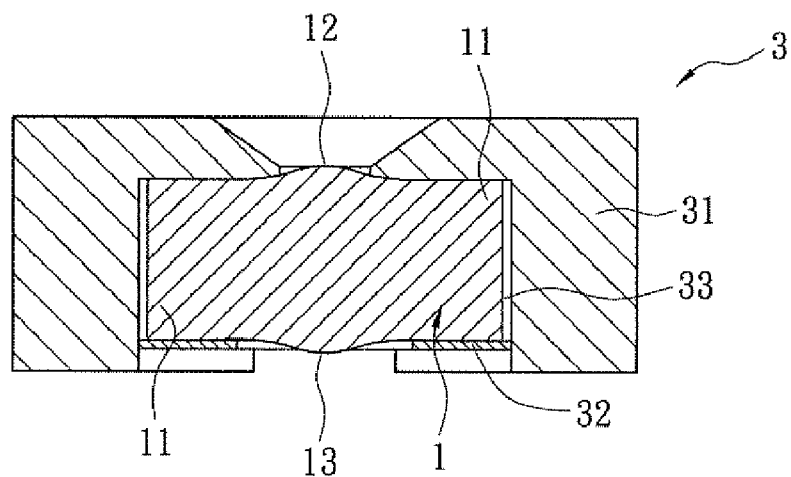
FIG. 12 is a side view of the embodiment of the present invention applied to a lens module.
Figure 13:
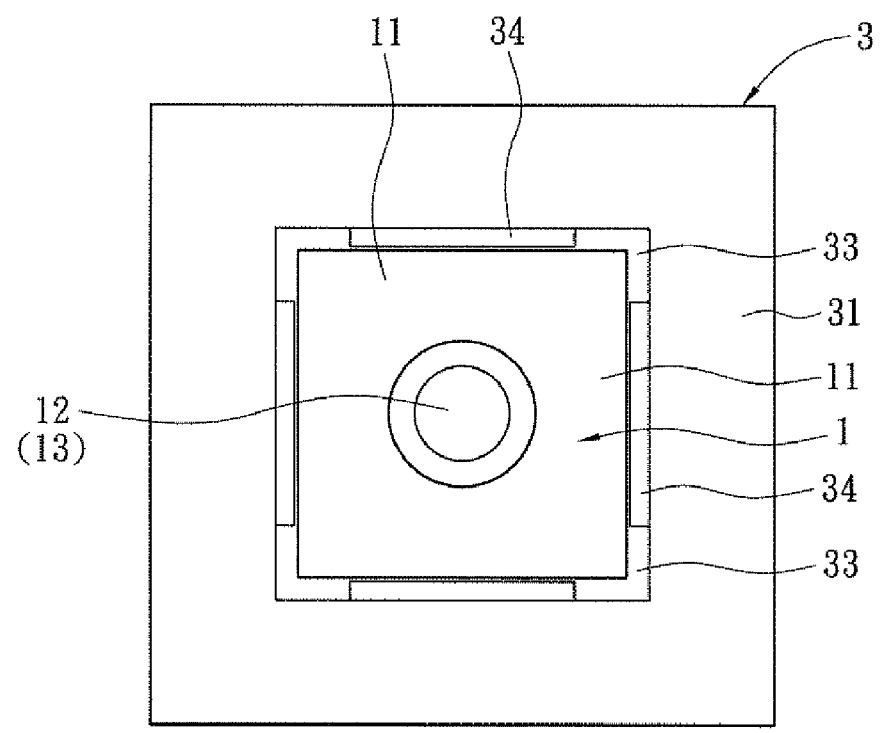
FIG. 13 is a front view of the embodiment in FIG. 12.

Refer to FIG. 10 & FIG. 11, a biconvex rectangular optical glass lens 1 of this embodiment consists of a first optical surface 12, a second optical surface 13 and a circumference 11. The focal length of the lens 1 is 1.796 mm for this embodiment. As shown in FIG. 12 & FIG. 13, while assembled with the lens module 3, the lens is applied to the CMOS sensor whose diagonal line is less than 1/10". As to the first optical surface and the second optical surface 12, 13 in this embodiment, the related parameters are designed by aspherical surface equation (1) and show in the table two.

TABLE TWO

| first optical surface 12 | |
|---|---|
| R = −1.219431 | K = 2.492548 |
| | $A_4$ = −0.899965 |
| | $A_6$ = 53.482671 |
| | $A_8$ = −1769.1958 |
| | $A_{10}$ = 25738.761 |
| | $A_{12}$ = −131641.38 |
| | $A_{14}$ = 0 |
| second optical surface 13 | |
| R = −1.986938 | K = 2.06581 |
| | $A_4$ = 0.186610 |
| | $A_6$ = 6.186899 |
| | $A_8$ = −35.21707 |
| | $A_{10}$ = 74.223531 |
| | $A_{12}$ = −30.585622 |
| | $A_{14}$ = 0 |

Refer to FIG. 12 & FIG. 13, the lens module 3 includes the rectangular optical glass lens 1, the lens base 31 and the aperture 32. The rectangle circumference 11 is fixed on the lens base 31 while the first optical surface 12 and the second optical surface 13 are optical areas for focusing light entering the aperture 32 onto the CMOS sensor (not shown in figure).

The manufacturing method of the rectangular optical glass lens 1 in this embodiment is similar to that of the first embodiment in FIG. 9. But the cavity surface 50 of the mold 5 is biconcave. That means the cavity surface 50 of the upper mold 51 as well as the lower mold 52 is concave aspherical surface so that the lens 1 pressed and molded is a biconcave aspherical lens. Moreover, the lens 1 of this embodiment has similar assembling design with the first embodiment. The unpolished irregular corner is mounted inside the corresponding slot 33 of the lens module 3 so that the assembling precision is not affected. Furthermore, the cost is reduced due to omission of polishing.

The Third Embodiment

Figure 14:
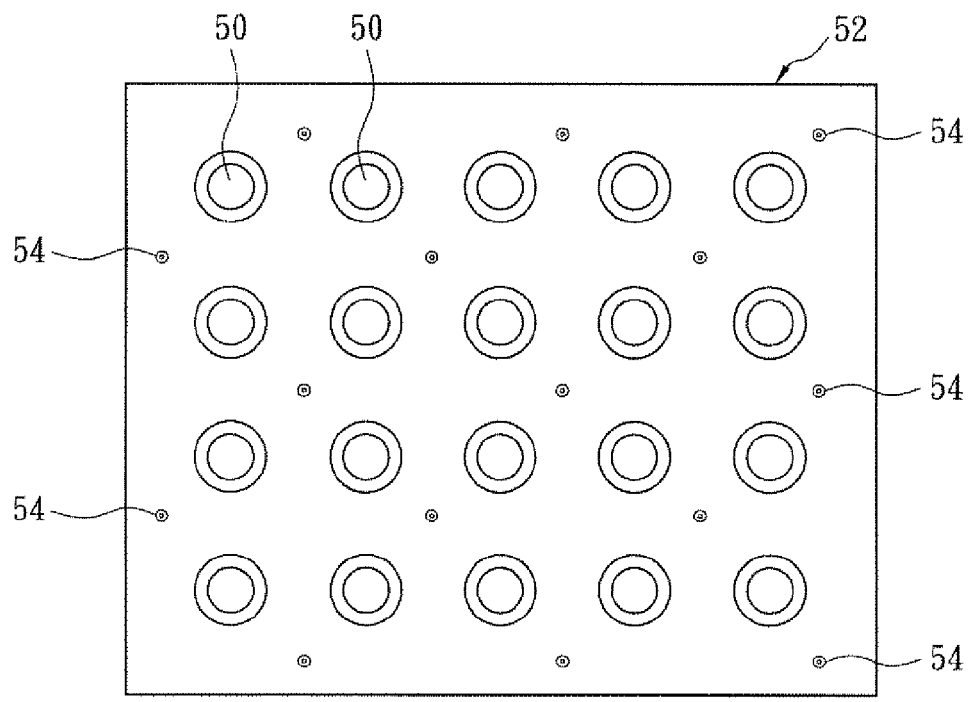
FIG. 14 is a lower mold of a further embodiment according to the present invention.
Figure 15:
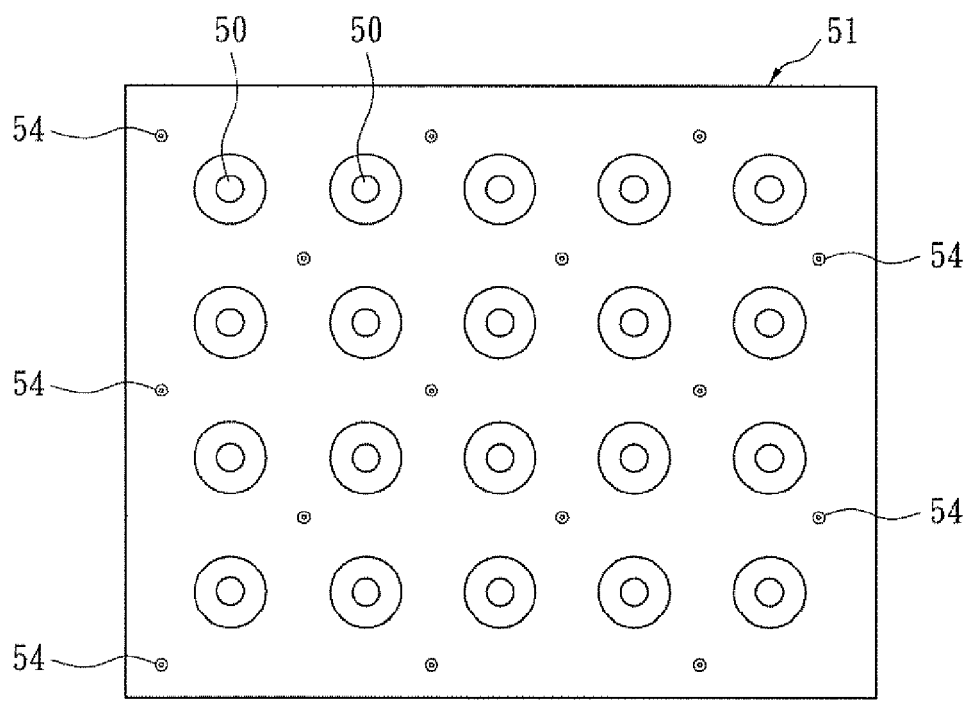
FIG. 15 is an upper mold of a further embodiment according to the present invention.
Figure 17:
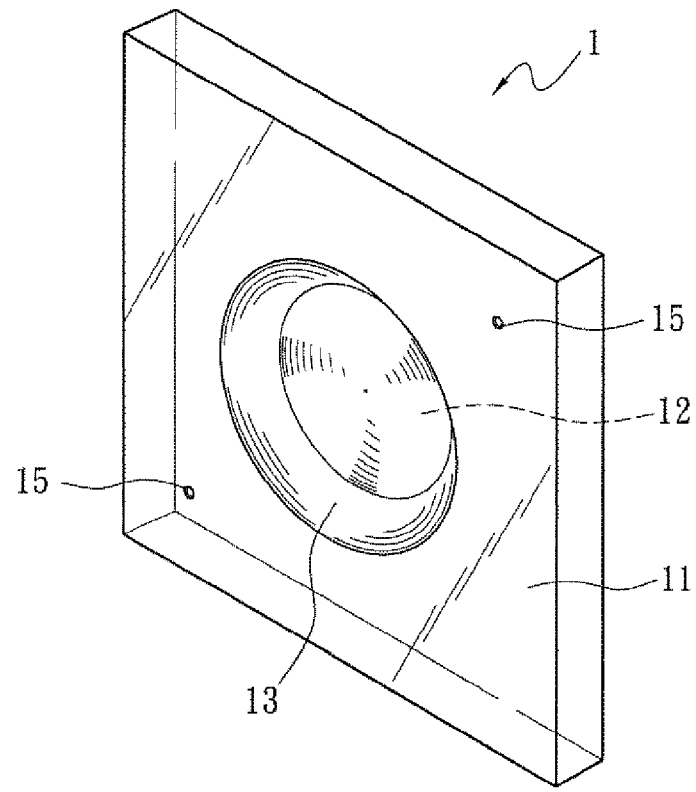
FIG. 17 is a perspective view of the embodiment according to the present invention.

Refer to FIG. 17, a rectangular optical glass lens 1 is made by a mold with protrudent part 54, as shown in FIG. 14 & FIG. 15. In conventional molding processes of glass lenses, generally air inside the mold cavity is released by vacuum pumping so as to avoid bubbles caused by residual air in the mold cavity that may lead negative effects on the lens precision. During the molding processes, the glass preform presses the lower mold so that the air inside the mold cavity is getting difficult to be exhausted. In molding processes of a single cavity mold, there are several techniques to overcome the problem. Yet during multi-cavity glass molding processes, the air-releasing is still a problem.

Figure 16:
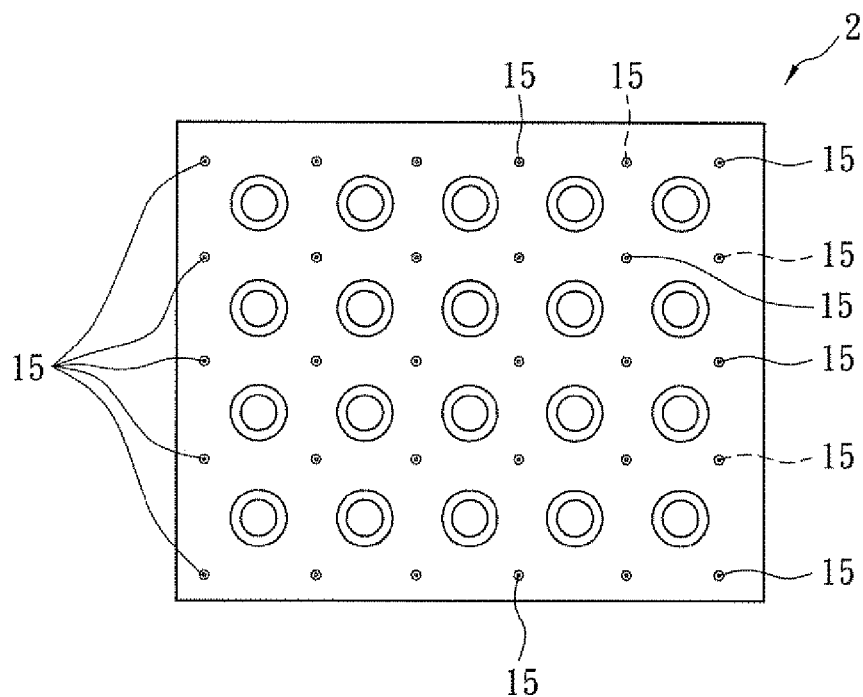
FIG. 16 is a lens sheet of a further embodiment according to the present invention.

Refer to FIG. 9 & FIG. 14, a rectangular optical glass lens 1 in this embodiment can be a convex-concave, biconvex, as the first and the second embodiments, or other types aspherical lens and steps of the manufacturing method are similar to that of the first embodiment. In a mold 5 of this embodiment, a plurality of protruding parts 54 with similar height is disposed on peripherals of aspherical cavity surfaces 50 of the upper mold and the lower mold core 51, 52. The upper mold 51 can also be disposed without protruding parts 54. The way of disposition and the number of the protruding part 54 depend on the number of the cavity surfaces 50 and the result of calculations (or, experiments). During the vacuum pumping process in the beginning of the molding process, air in the mold cavity is released from gaps surrounding the protruding parts 54 formed by the height difference so as to achieve high air-exhaust efficiency δ. Refer to FIG. 16, a corresponding groove 15 is formed on a lens sheet 2 by each protruding part 54. After the lens sheet 2 being cut, such groove 15 may still be left on the circumference 11 of the rectangular optical glass lens 1, as shown in FIG. 17, depending on position of the protruding part 54 or cutting lines. Yet the groove 15 have no effects on the size and the precision of the circumference 11 of the rectangular optical glass lens 1 in the assembling with lens holder 31. Thus the present invention overcomes the shortage of air-exhaust slots disposed on conventional molds that lead to protrudent parts on the circumference of the lens and size as well as precision of the circumference 11 of the rectangular optical glass lens 1 is affected by the protrudent part. By means of the mold 5 disposed with the protruding part 54, the yield rate of the lens 1 according to the present invention is increased and such design of the mold will not affect following assembling.

The Fourth Embodiment

Figure 20:
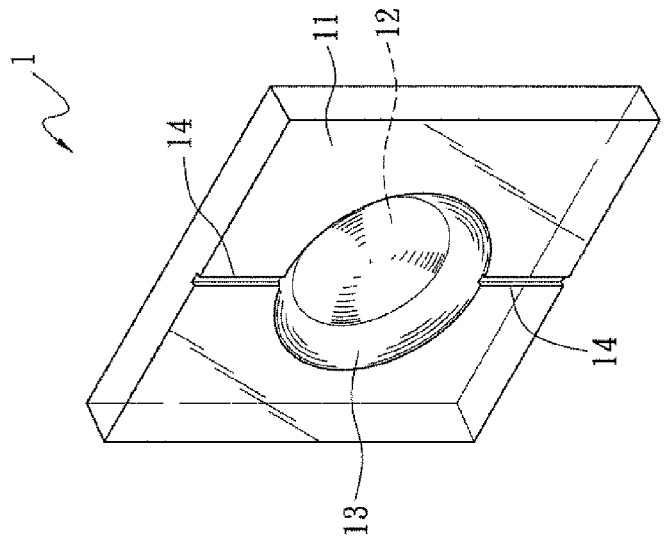
FIG. 20 is a perspective e view of the embodiment according to the present invention.
Figure 18:
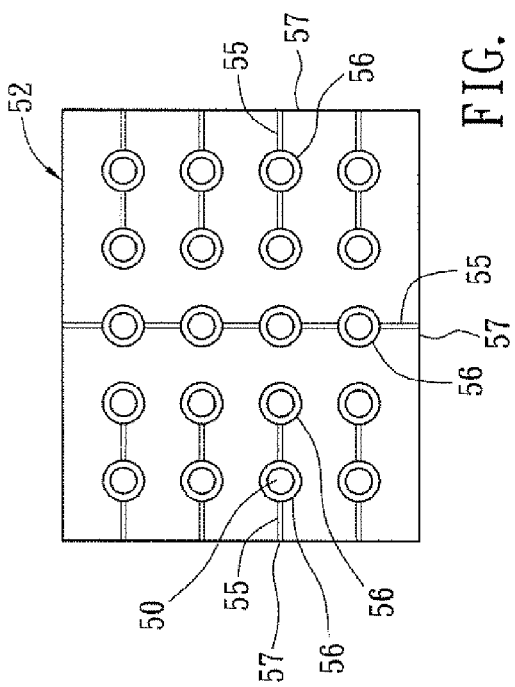
FIG. 18 is lower mold of a further embodiment according to the present invention.
Figure 19:
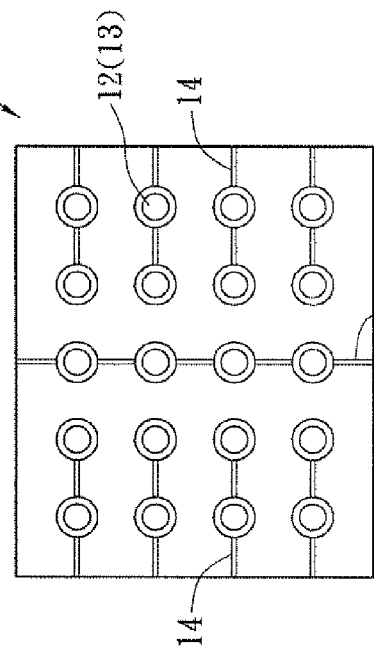
FIG. 19 is a lens sheet of a further embodiment according to the present invention.

Refer to FIG. 20, a rectangular optical glass lens 1 in this embodiment is formed by a mold with bar-like protruding part in FIG. 18. Such design is especially suitable for the mold 5 having difficulties in air-exhaust due to higher depth thereof and a cavity surface 50 with larger diameter. In order to increase the air-exhaust efficiency δ, the protruding part 54 in the third embodiment is replaced by a bar-like protruding part 55, being disposed on an outer ring surrounding the cavity surface 50 of the lower mold 52 and/or the upper mold 51. The bar-like protruding part 55 extends from surroundings 56 of the cavity surface 50 to the peripheral 57 of the mold 5, as shown in FIG. 18. The manufacturing method of this embodiment is the same with that of the previous embodiment. Refer to FIG. 19, the molded lens sheet 2 includes strip grooves 14 corresponding to the bar-like protruding part 55. Refer to FIG. 20, after being cut, the rectangular optical glass lens 1 includes a first optical surface 12, a second optical surface 13 and a rectangle circumference 11. Even there is some strip groove 14 left on the rectangle circumference 11 (depending on positions of the bar-like protruding part 55 or cutting lines), the size and the precision of the circumference 11 are not affected. Thus the mold 5 with at least one bar-like protruding part 55 improves yield rate of the lens 1 and has no negative effect on following assembling processes.

The Fifth Embodiment

Figure 21:
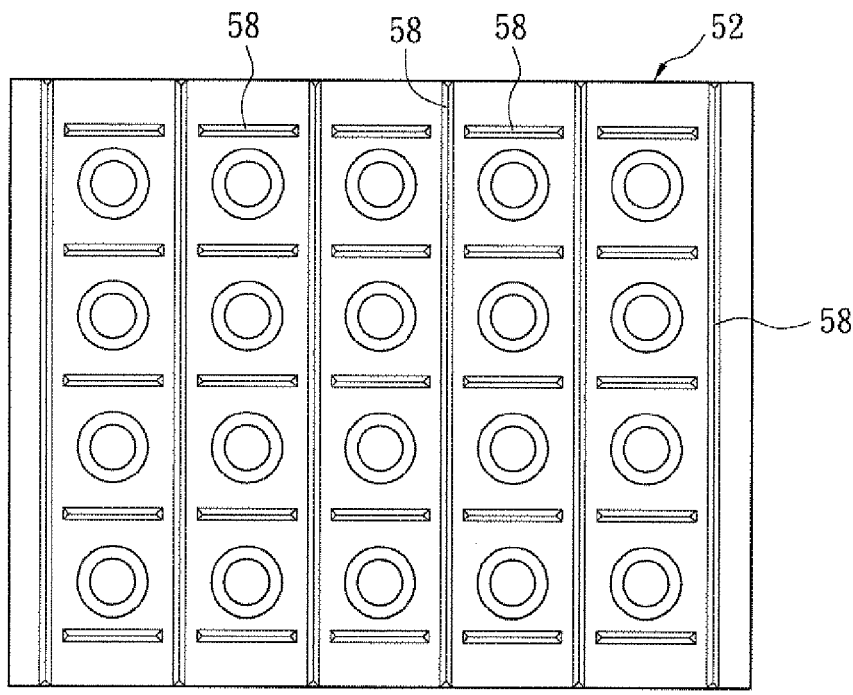
FIG. 21 is lower mold of a further embodiment according to the present invention.
Figure 22:
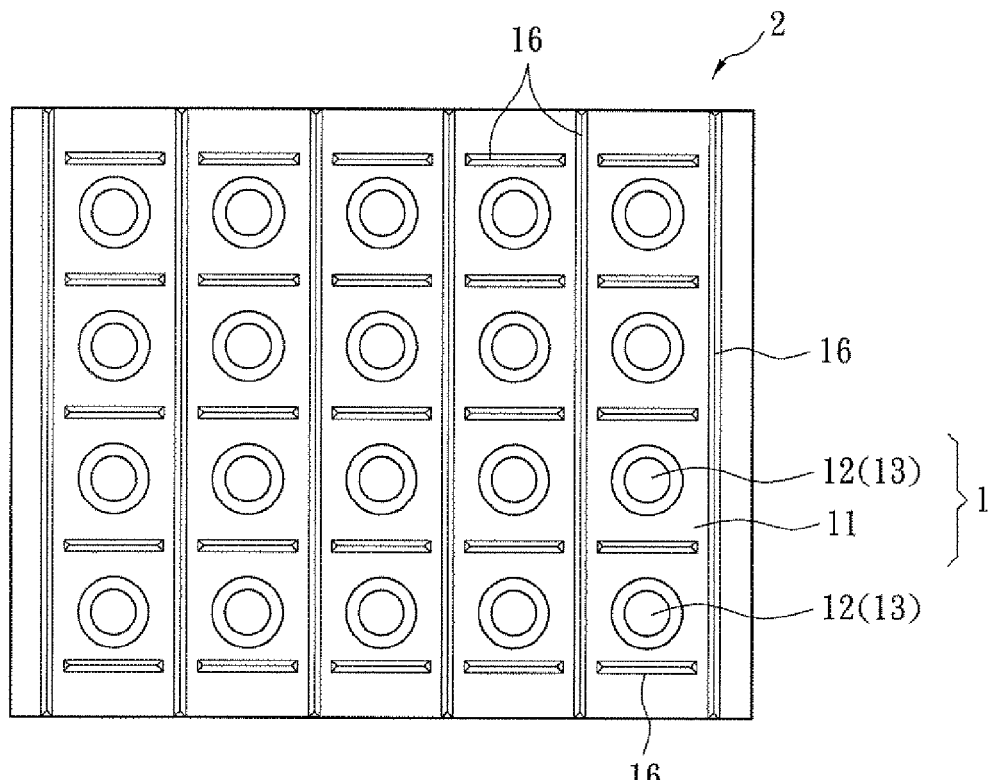
FIG. 22 is a lens sheet of a further embodiment according to the present invention.

Refer to FIG. 22, a rectangular optical glass lens 1 in this embodiment is formed by a mold with a plurality of inverted V-shaped strip protrusions (in FIG. 21). The inverted V-shaped strip protrusions 58 with the similar height are arranged on a cavity surface 50 in a certain interval vertically and/or horizontally so that air inside the cavity is released during molded forming processes due to a gap formed by difference in height between the rectangular glass blank 4 and the inverted V-shaped strip protrusion 58 so as to improve the air-exhaust efficiency. Moreover, the inverted V-shaped strip protrusion 58 forms corresponding V-shaped cutting groove 16 on the lens sheet 2, as shown in FIG. 22, and the cutting grooves 16 can be used as part of cutting lines of the lens sheet 2. The lens sheet 2 is cut into a plurality of rectangular lens 1 with the same size.

Figure 23:
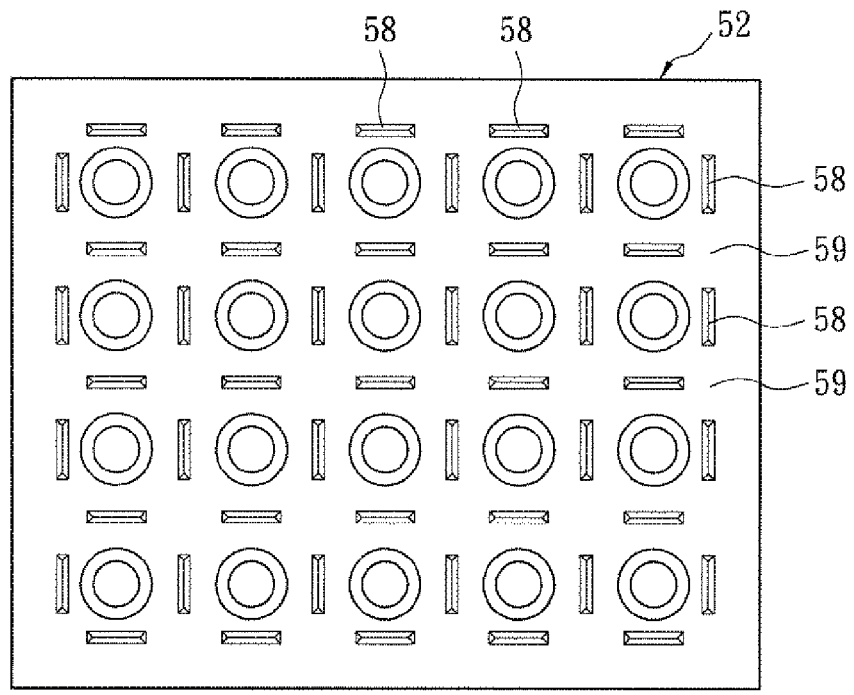
FIG. 23 is the other mold of a further embodiment according to the present invention.
Figure 24:
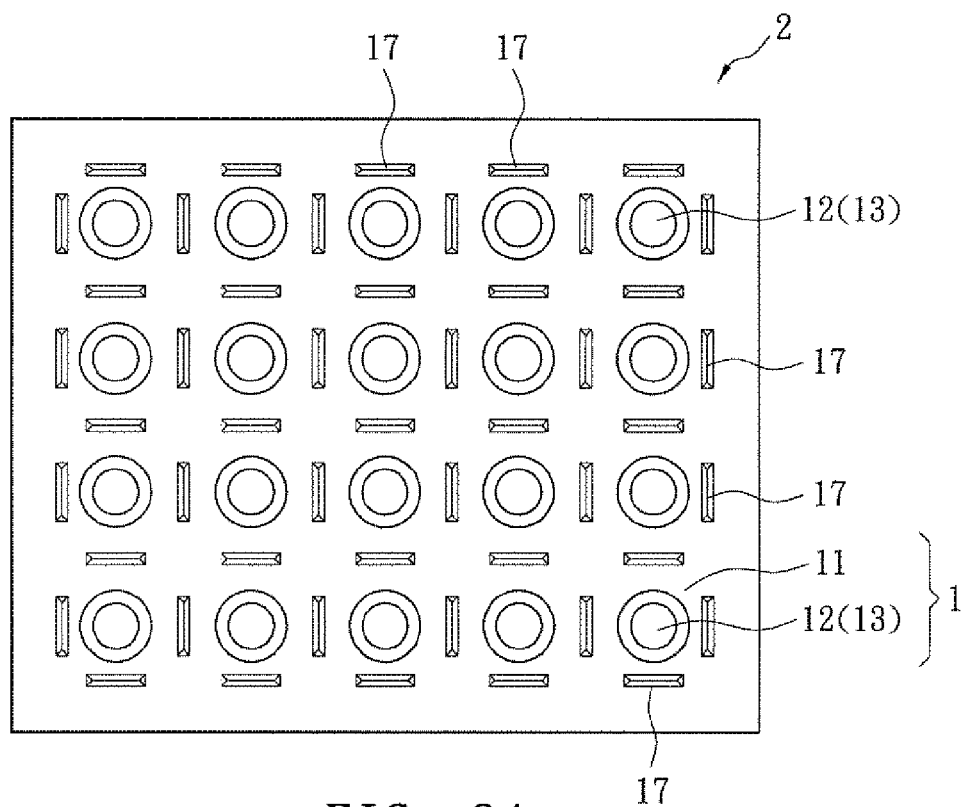
FIGS. 24 is another lens sheet of a further embodiment according to the present invention.

Refer to FIG. 23, the above inverted V-shaped strip protrusion 58 is further arranged in discontinuing arrangement. That means a plurality of inverted V-shaped strip protrusions 58 are disposed discontinuously. There is a gap 59 between two contiguous inverted V-shaped strip protrusions 58 so as to improve air-exhaust efficiency. As shown in FIG. 24, the molded lens sheet 2 includes a plurality of discontinuous V-shaped cutting groove 17 that can work as cutting lens and this is convenient for cutting operation of the lens 1.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A rectangular optical glass lens formed by cutting of a lens sheet having a plurality of lens arrays produced by a rectangular glass blank heated and pressured between an upper mold and a lower mold of a multi-cavity mold comprising:
   an aspherical first optical surface disposed on one side of the lens;
   an aspherical second optical surface disposed on the opposite side of the first optical surface; and
   a rectangle circumference arranged surrounding the first optical surface and the second optical surface;
   wherein the first optical surface and the second optical surface are optical areas of the rectangular optical glass lens;
   the rectangle circumference is non-optical area and rectangular with four corners;
   wherein the rectangle circumference are formed by cutting of the lens sheet; wherein at least one surface of the rectangle circumference further comprises at least one groove which is formed under the surface of the rectangle circumference and does not protrude from the surface of the rectangle circumference and is formed and molded on the lens sheet due to a protruding part for exhausting air arranged surrounding a cavity of the upper or lower mold.

2. The rectangular optical glass lens as claimed in claim 1, wherein the first optical surface and the second optical surface are formed by a convex aspheric surface and a concave aspheric surface.

3. The rectangular optical glass lens as claimed in claim 1, wherein the first optical surface and the second optical surface are two convex aspheric surfaces.

4. The rectangular optical glass lens as claimed in claim 1, wherein the groove is a strip groove.

5. The rectangular optical glass lens as claimed in claim 1, wherein the groove is a plurality of V-shaped cutting grooves in a certain interval vertically and/or horizontally, wherein the V-shaped cutting grooves are formed and molded on the lens sheet due to inverted V-shaped strip protrusion for exhausting air arranged surrounding the cavity of the upper or lower mold.

6. The rectangular optical glass lens as claimed in claim 5, wherein the V-shaped cutting grooves formed on lens sheet are used as cutting lines to form rectangular shape and right angle of the rectangle circumference.

7. A manufacturing method of a rectangular optical glass lens comprising the steps of:
   providing a rectangular glass blank;
   provide a multi-cavity mold having an upper mold and a lower mold respectively disposed with at least one upper cavity and at least one corresponding lower cavity while the upper cavity is for a first optical surface and the lower cavity is for a second optical surface; wherein a cavity of the upper mold and/or the lower mold is disposed with a plurality of protruding parts protruded from the cavity and not formed under the cavity so that air in the cavity is released from gaps surrounding the protruding parts formed by height difference during molding processes;
   set the rectangular glass blank in the multi-cavity mold, being heated and pressured so that the rectangular glass blank molded to form a lens sheet having a plurality of first optical surfaces and corresponding second optical surfaces;
   cut the lens sheet into a plurality of rectangular optical glass lenses; wherein the rectangular optical glass lens includes a first optical surface, a second optical surface and a rectangle circumference arranging around the first optical surface and the second optical surface while the rectangular shape and rectangle on four corners of the rectangle circumference are formed during the step of cutting the lens sheet.

8. The method as claimed in claim 7, wherein the plurality of protruding parts are bar-like protruding parts.

9. The method as claimed in claim 8, wherein the bar-like protruding parts extend from surroundings of the cavity of the upper mold and the lower mold to peripherals of the mold.

10. The method as claimed in claim 7, wherein the plurality of protruding parts are inverted V-shaped strip protrusions arranged in a certain interval vertically and/or horizontally.

11. The method as claimed in claim 10, wherein in the step of cutting the lens sheet, the lens sheet is cut into rectangular optical glass lenses according to vertical and/or horizontal V-shaped cutting grooves corresponding to the inverted V-shaped strip protrusions.

12. The method as claimed in claim 10, wherein the plurality of inverted V-shaped strip protrusions vertically or horizontally on the cavity of the upper mold and/or the lower mold are disposed discontinuously so that a gap is formed between two contiguous inverted V-shaped strip protrusions.

* * * * *